United States Patent [19]
Wurth et al.

[11] Patent Number: 5,720,417
[45] Date of Patent: Feb. 24, 1998

[54] APPLICATOR HEAD FOR DOSED DISPENSATION OF FLUID MEDIUMS

[75] Inventors: Heiko Wurth, Oberursel; Martin Reuter, Dachau, both of Germany

[73] Assignee: ITW Dynatec GmbH Klebetechnik, Erkrath, Germany

[21] Appl. No.: 415,830

[22] Filed: Apr. 3, 1995

[30] Foreign Application Priority Data

Apr. 2, 1994 [DE] Germany ............... 44 11 569.5

[51] Int. Cl.⁶ ................................................. B67D 5/62
[52] U.S. Cl. ................... 222/146.5; 222/504; 222/509
[58] Field of Search ........................... 222/54, 146.5, 222/504, 509

[56] References Cited

U.S. PATENT DOCUMENTS

| | | |
|---|---|---|
| 1,504,773 | 8/1924 | Marston . |
| 3,614,486 | 10/1971 | Smiley .................... 310/8.2 |
| 4,022,166 | 5/1977 | Bart ....................... 123/32 JV |
| 4,066,188 | 1/1978 | Scholl et al. ............ 222/504 X |
| 4,262,824 | 4/1981 | Hrynewycz ............. 222/504 X |
| 4,284,263 | 8/1981 | Newcomb ...................... 251/129 |
| 4,431,136 | 2/1984 | Janner et al. ............... 239/102 |
| 4,499,737 | 2/1985 | Binnig et al. ................... 62/56 |
| 4,535,810 | 8/1985 | Duder et al. ................ 137/596.17 |
| 4,560,871 | 12/1985 | Bowman et al. .................. 250/288 |

(List continued on next page.)

FOREIGN PATENT DOCUMENTS

| | | |
|---|---|---|
| 2 188 771 | 6/1972 | France . |
| 2 498 285 | 1/1981 | France . |
| 16 52 298 | 12/1967 | Germany . |
| 17 51 543 | 6/1968 | Germany . |
| 25 57 972 | 2/1975 | Germany . |
| 32 00 469 | 1/1982 | Germany . |
| 34 22 935 | 8/1984 | Germany . |
| 36 37 631 | 11/1986 | Germany . |
| 43 25 143 | 7/1993 | Germany . |
| 62-228664 | 10/1987 | Japan . |
| 3-234981 | 10/1991 | Japan . |
| 6-277597 | 10/1994 | Japan . |
| 928089 | 5/1982 | U.S.S.R. . |
| WO89/04728 | 6/1989 | WIPO . |
| WO90/00852 | 1/1990 | WIPO . |
| WO91/12921 | 9/1991 | WIPO . |

OTHER PUBLICATIONS

German Abstract — DE 3337–234–A.
German Abstract — DE 3233–161–A.
German Abstract — DE 3205–654.
German Abstract — DS 3037–078.
German Abstract — DE 3006–298–C.
French Abstract — FR 2425–599.
French Abstract — FR 2642–812–A.
French Abstract — FR 2498285.
European Abstract — EP 46–431.
European Abstract — EP 165–407–A.
European Abstract — EP 491652–A1.

Primary Examiner—Joseph Kaufman
Attorney, Agent, or Firm—Schwartz & Weinrieb

[57] ABSTRACT

The present invention comprises an applicator head for the dosed dispensation of fluid mediums wherein a valve member and a valve drive are arranged within a casing. The valve drive comprises at least one piezoelectric element connected with a voltage supply and comprising several parallel, juxtaposed piezoelectric stacks which are flexibly mounted. The present invention provides a piezoelectrically driven applicator head which is simple and economical to manufacture, and which is usable not only in the low-temperature range but also in the high-temperature range. The valve drive also includes a rocker member which is pivotably mounted at a joint region, a free end of the rocker member is fixedly connected to the valve member, and the piezoelectric element comprises two piezoelectric stacks which are operatively connected to the joint region of the rocker member upon opposite sides of an axis extending perpendicularly through the joint region and wherein the piezoelectric stacks are adapted to be alternately actuated with respect to the rocker member.

27 Claims, 3 Drawing Sheets

U.S. PATENT DOCUMENTS

| | | | |
|---|---|---|---|
| 4,610,426 | 9/1986 | Brandner | 251/129.06 |
| 4,684,104 | 8/1987 | Micard | 251/129.05 |
| 4,699,660 | 10/1987 | Weber et al. | 239/102.2 |
| 4,711,379 | 12/1987 | Price | 222/504 |
| 4,758,226 | 7/1988 | Carre | 604/141 |
| 4,787,071 | 11/1988 | Krueter et al. | 367/140 |
| 4,801,051 | 1/1989 | Lewis et al. | 222/504 X |
| 4,825,894 | 5/1989 | Cummins | 137/82 |
| 4,843,951 | 7/1989 | Bruggen et al. | 92/5 R |
| 4,903,732 | 2/1990 | Allen | 137/626.65 |
| 4,932,393 | 6/1990 | Sim | 126/413 |
| 5,040,567 | 8/1991 | Nestler et al. | 137/625.04 |
| 5,076,314 | 12/1991 | Ikehata et al. | 137/82 |
| 5,079,472 | 1/1992 | Uhl et al. | 310/332 |
| 5,085,125 | 2/1992 | Emo et al. | 91/459 |
| 5,085,399 | 2/1992 | Tsutsui et al. | 251/30.03 |
| 5,092,360 | 3/1992 | Watanabe et al. | 137/487.5 |
| 5,094,429 | 3/1992 | Dostert | 251/129.06 |
| 5,154,322 | 10/1992 | Sim | 222/146.2 |
| 5,203,537 | 4/1993 | Jacobs et al. | 251/129.06 |
| 5,224,510 | 7/1993 | Periclos | 137/487.5 |
| 5,271,226 | 12/1993 | Stone | 60/233 |
| 5,328,149 | 7/1994 | Reutor | 251/129.06 |
| 5,343,894 | 9/1994 | Frisch et al. | 137/625.65 |
| 5,346,098 | 9/1994 | King et al. | 222/146.5 |
| 5,356,034 | 10/1994 | Schlumberger | 222/504 X |
| 5,375,738 | 12/1994 | Walsh et al. | 222/504 X |

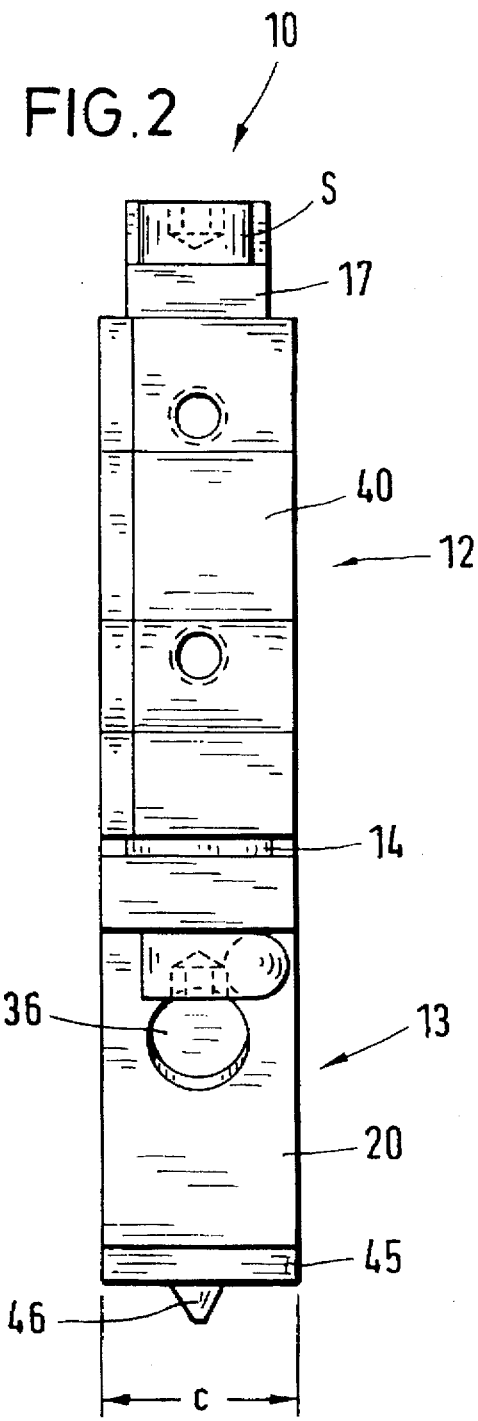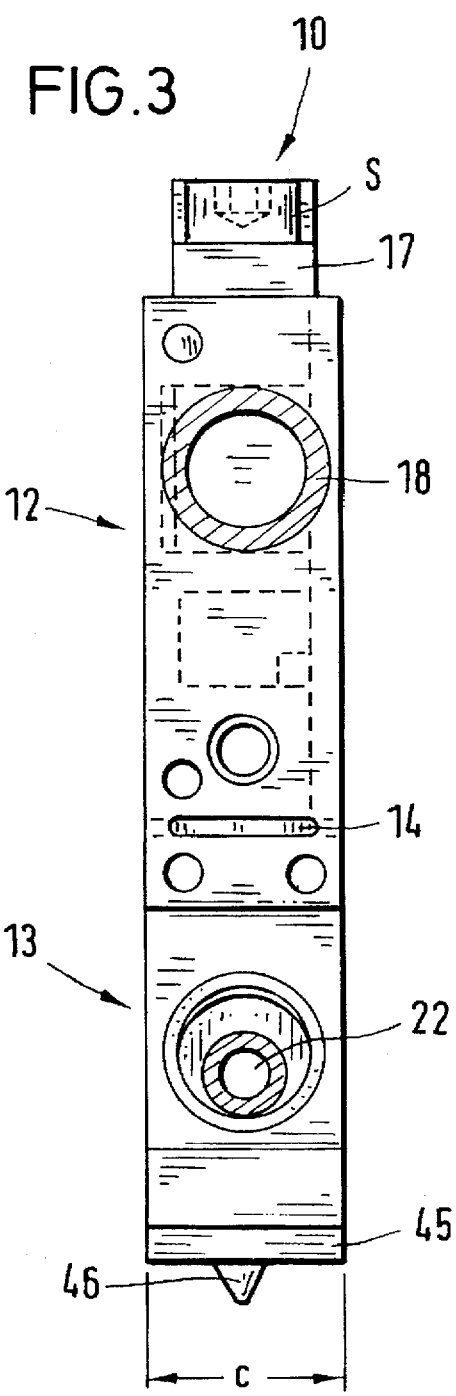

1

APPLICATOR HEAD FOR DOSED DISPENSATION OF FLUID MEDIUMS

FIELD OF THE INVENTION

The invention concerns an applicator head for the dosed dispensation of fluid mediums, specifically hot-melt adhesives, lubricants, paints or similar compositions, with a casing in which a valve element and a valve drive are arranged, the valve drive consisting of at least one piezoelectric element connected to a voltage supply, and featuring several piezoelectric stacks arranged side by side in parallel fashion, the piezoelectric stacks being flexibly mounted and said valve drive acting at least indirectly on the valve element.

BACKGROUND OF THE INVENTION

Not verifiable by prior printed publication but previously used in a notorious manner, an applicator head of the type with which the present invention is concerned provides for the application of, for example, hot-melt adhesive on a substrate consisting of cardboard, paper, textile, fleece and similar materials, with the web type substrate being passed by the stationary applicator head. The applicator head features a valve drive consisting of a piezoelectric element and acting directly on the valve member. The piezoelectrically driven applicator head has the advantage that its maximum frequency is distinctly greater than that of applicator heads actuated electromagnetically or pneumatically. Moreover, this known prior art enables the generation of considerably greater valve forces. Lastly, a piezoelectrically driven applicator head involves considerably smaller dimensions than applicator heads driven electrically or pneumatically.

As a disadvantage, though, the valve stroke generated by the piezoelectric drive is very small, since the piezoelectric element has upon application of a voltage only a maximum stroke of about 1.4 to 1.7 per mil of its overall length.

Piezoelectric elements basically expand distinctly upon heat buildup consequently, the piezoelectric element consists for reasons of temperature compensation of three piezoelectric stacks juxtaposed in parallel fashion and flexibly mounted in an expensive manner, with the center piezoelectric stack serving to exclusively actuate the valve. This type of temperature compensation adds considerably to the expense in the manufacture of the prior applicator head.

Furthermore, the prior applicator head harbors the risk, especially when using hot-melt adhesives having temperatures between 150° and 200° C., that the piezoelectric element will be heated beyond its temperature limit of 100° to 130° C. and thereby destroyed.

Therefore, the problem underlying the invention is to provide a piezoelectrically driven applicator head which allows easy and low-cost manufacture and can be used not only in the low-temperature range, but also in the high-temperature range.

SUMMARY OF THE INVENTION

The solution to this problem is provided by means of an applicator head constructed in accordance with the present invention, wherein the valve drive comprises a rocker pivotably mounted in the area of a joint and a piezoelectric element with two piezoelectric stacks, and in that a free terminal area of the rocker is joined to the valve member, and in that the piezoelectric stacks are in the jointed terminal area of the rocker arranged, in an evenly spaced manner, on both sides of an axis extending perpendicularly through the joint, and act alternately on the rocker.

The inventive applicator head basically has the advantage that the piezoelectric valve drive, with an automatic temperature compensation being present, consists now only of two piezoelectric stacks, with a slight enlargement in length of each individual piezoelectric stack being transformed to a relatively large valve stroke, due to transferring the motion originating from the two piezoelectric stacks by means of a rocker construction. Furthermore, the inventive valve drive generates a large valve force of about 3000N, with the time for the opening and closing cycle amounting to only 0.8 to 0.25 ms.

Moreover, the inventive valve drive is in a very simple manner constructed of few parts, whereby such allows a low-cost manufacture and features an overall small size. For instance, the inventive applicator head has a width of less than 20 mm.

In accordance with one embodiment of the invention, the rocker is fused, by way of the joint fashioned as a flexible narrow bridge of material, to a base part of stationary structure, while the rocker and the base part on the two sides of the joint are spaced from each other by a through-going gap.

This inventive structure of the valve drive has the advantage that the rocker, as well as the base part, can be made as one workpiece using a known electroerosion process. Created thereby is a very small, compact drive component. The width of the gap between the rocker and the base part is only sufficiently large enough to allow the rocker free movement during the operation of the applicator head.

Based upon the foregoing, another embodiment of the invention is characterized in that each piezoelectric stack is adhesively bonded to a connecting part which by means of a flexible, narrow bridge of material is joined to the rocker.

To prevent any reactive voltages, during any motion of the rocker, which are particularly harmful to the piezoelectric stacks, the latter are adhesively bonded to a connecting part which is also joined to the rocker in a bendable fashion. This jointed connection can also be manufactured in a simple and low-cost manner using the aforementioned electroerosion process. This means a simplification in terms of manufacturing, since the base part, the rocker and the connecting parts can be made of one workpiece. This rocker design also has the advantage of possessing a very long service life, that is, of more than 250 million cycles.

In a preferred embodiment of the invention, the casing is composed of two casing parts with a thermal separating layer arranged in between which is pierced only by the bar-shaped valve member. The first casing part accommodates the valve drive comprised of the piezoelectric element and the rocker, while the second casing part comprises a temperature-controlled duct for the medium and the valve opening, which is to be closed by a valve body.

This inventive embodiment of an applicator head can also be used favorably for the dosed dispensation of hot mediums, specifically hot-melt adhesives. Owing to the two-part structure of the casing and the interposed thermal separating layer, a substantial thermal decoupling of the two parts is already achieved. Furthermore, the inventive design of the valve drive also enables the spatial separation of the opening necessary for the valve member to pass therethrough and for the drive consisting of the piezoelectric stacks. The zone of weakness existing of necessity is thereby considerably spaced away from the piezoelectric stacks in terms of thermal separation of the two casing parts. That is, the not entirely preventable heat loss in the area of the valve member connecting the two casing parts leads to a local heat buildup which, however, is not large enough to constitute a hazard to the piezoelectric stacks.

In accordance with a further embodiment, based upon the foregoing, the valve member comprises a flexible cardan, or U-joint extending crosswise to the longitudinal expanse of the rocker. Arranged in the area of the first casing part of the valve member, this flexible cardan joint, to begin with, serves to equalize the circular pivoting motion of the rocker. Furthermore, however, the flexible cardan joint also offers the considerable advantage of possessing high thermal resistance, so that heat can be transferred by way of the valve rod only to a limited extent.

A predetermined amount of heat buildup, and thus expansion of the piezoelectric drive component, not being preventable, a further favorable embodiment comprises on the terminal areas of the piezoelectric stacks, away from the rocker, a flexible cover plate. It provides in a simple manner space for the thermal length change of the piezoelectric elements resulting from a temperature increase. The two piezoelectric elements undergo an even heat buildup, an automatic temperature compensation on the rocker being given by the arrangement of the piezoelectric stacks, which are evenly spaced from the axis extending perpendicularly through the casing.

In a particularly preferred embodiment of the invention, a charge pump arrangement that reduces energy consumption is provided between the voltage supply and the piezoelectric elements, enabling essentially a complete charge exchange.

The reduced energy consumption of the piezoelectric elements also results, in an especially favorable fashion, in reduced thermal losses in the electronic system, whereby the piezoelectric stacks build up heat to a reduced extent. Furthermore, of course, the overall operation of the applicator head is rendered more cost-effective.

The charge pump arrangement may in a favorable manner comprise an intermediate storage arrangement consisting of a coil and a capacitor, a plurality of transistors acting on the intermediate storage arrangement and the piezoelectric stacks, and a programmable controller which determines the charge reversal operations. This electronic arrangement makes it possible to transform the electrical charge essentially completely from one piezoelectric stack to the other, so that during the applicator head operation only as much energy needs to be supplied as is required to cover the thermal losses and the losses created due to the conversion of electrical energy to mechanical energy.

Lastly, an especially preferred embodiment comprises a valve drive with a path measuring device consisting of a stationary printed circuit and two mutually spaced current carrying coils mounted on it, with a tongue type projection of the rocker protruding in between the coils.

The path measuring system makes it possible to regulate the valve in such a way that a very specific valve curve is achieved. Owing to the motion of the tongue type projection parallel to the rocker motion, the inductance of the current-carrying coils changes. When the tongue type projection moves down, the inductance of the lower coil becomes greater while the inductance of the upper coil diminishes. These inductance changes are measured and are a direct measure of the position of the valve.

BRIEF DESCRIPTION OF THE DRAWINGS

Various other objects, features, and attendant advantages of the present invention will be more fully appreciated from the following detailed description, when considered in connection with the accompanying drawings in which like reference characters designate like or corresponding parts throughout the several views, and wherein:

FIG. 2 is a side elevation of the applicator head according to the arrow referenced 2 in FIG. 1;

FIG. 3, a side elevation of the applicator head according is the arrow referenced 3 in FIG. 1.

DETAILED DESCRIPTION OF THE PREFERRED EMBODIMENT

Figure 1:
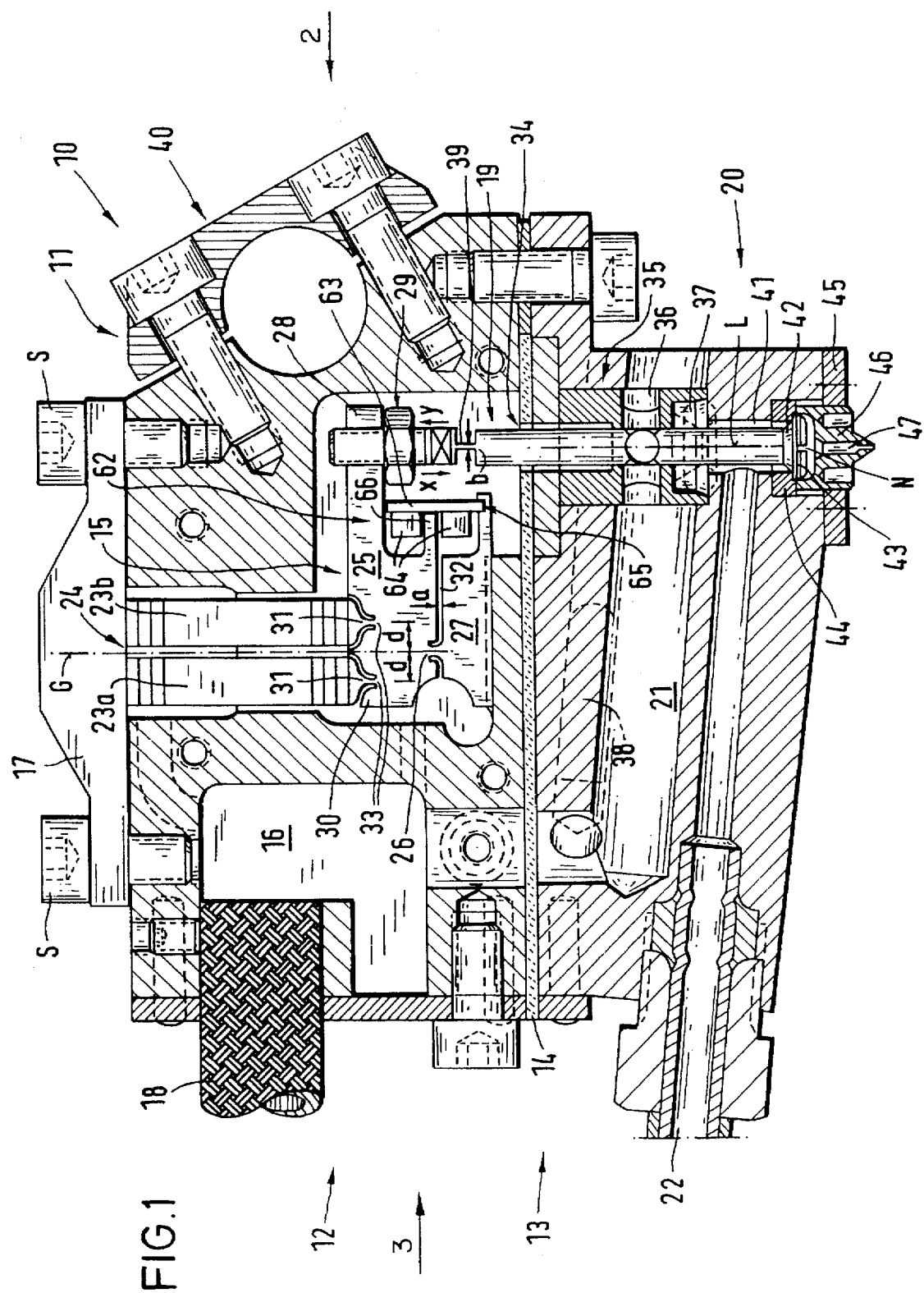
FIG. 1 is a longitudinal cross-sectional view through an applicator head.

In the drawings, the applicator head for dosed dispensation of hot-melt adhesive is generally indicated by the reference character 10.

The applicator head compromises a casing 11 which is subdivided into casing parts 12 and 13. A thermal separating layer 14 is arranged between the casing components 12 and 13 which are secured together by bolt fasteners. A plurality of applicator heads 10 are arranged side by side in an adhesive applicator machine, not shown, with the aid of a mounting device 40.

Contained in the casing part 12 are essentially a valve drive 15, a chamber 16 for electronic components not illustrated, and an electrical supply and control line 18. The casing part 13 contains a rod-shaped valve member 19 protruding into a valve head 20, a heater 21, and a hot-melt adhesive duct 22.

The valve drive 15 comprises a piezoelectric element 24 consisting of two piezoelectric stacks 23a and 23b which have respective first ends thereof bearing with one end on a flexible cover plate 17 which is fastened to the upper casing 12 with screws S. The piezoelectric stacks 23 are each comprised of about 200 ceramic blades having a thickness of 0.1 mm and glued to one another.

Furthermore, the valve drive 15 comprises a rocker 25 which by way of a joint 26 connects to a base part 27. While the valve member 19 is by means of a screw joint 29 secured to the free end 28 of the rocker 25, the two piezoelectric stacks 23a and 23b are arranged in jointed fashion on the end 30 of the rocker 25, in the way described hereafter.

Not only are the rocker 25, joint 26 and base part 27 fused to one another, but also two connecting parts 31 serving to jointly mount the piezoelectric stacks 23a and 23b on the rocker 25 are also fused together. They are jointly made of a single component using the electroerosion process. Thus, the joint 26 connecting the rocker 25 with the base component 27 consists of a flexible narrow bridge of material which on both sides is bounded by a gap 32 which provides the relative motion of the rocker 25 in relation to the base part 27. Similarly, the connecting parts 31 adhesively bonded to the piezoelectric stacks 23 are connected to the rocker 25, by fusion, through a joint 33.

The piezoelectric stacks 23a and 23b are indirectly, through the joint 33, connected with the rocker 25, on both sides of a perpendicular axis G extending through the joint, with a spacing d defined therebetween. As a result of, in conjunction with the flexible mounting of the piezoelectric stacks 23a and 23b by means of the cover plate 17, an automatic temperature compensation system is achieved.

Since the piezoelectric stacks 23a and 23b connect to a voltage supply, a lower blade not illustrated of each one of the piezoelectric stacks 23a and 23b bordering each on the connecting part 31 comprises as an insulating layer which safeguards the electrical separation between rocker 25 and piezoelectric stacks 23a and 23b.

The rod-shaped valve member 19 connected to the free end 28 of the rocker 25 traverses the thermal layer 14 between the casing parts 12 and 13 in the area of an opening 34. Arranged below the opening 34 is a brass sleeve 35 serving to accommodate a sealing system. The brass sleeve 35 comprises a leakage bore 36 extending transverse to the longitudinal axis of the valve member 19. In case a teflon-filled annular gland 37 arranged in the lower area of the brass sleeve 35 should leak, hot-melt adhesive issues visibly out of the leakage bore 36. However, the leakage bore 36 is likewise provided as an assembly bore for the heating cartridge 21 arranged in the casing part 13 and, bordering on the brass sleeve 35.

Illustrated above the heating cartridge 21, by dash-dot lines in FIG. 1, is a temperature sensor 38. Below the heating cartridge 21, in the hot-melt adhesive duct 22, the hot-melt adhesive is fed at high pressure by a melting device, not illustrated, and a heated hose line toward the valve head 20. The hot-melt adhesive duct 22 empties into an annular space 41 surrounding the valve member 19. The latter comprises on its free end a valve body 42 provided with an actuating groove N providing rotary adjustment of the valve element. A valve opening contained in the valve head 20 can be closed by means of valve body 42.

In the situation illustrated in FIG. 1, sealing surfaces 43 on the valve body 42 bear on a valve seat 44 consisting of hardened steel. Near the valve body, a nozzle component 46 is threadedly engaged with the valve head 20 by means of a nozzle plate 45. The nozzle component 46 comprises a centered, narrow nozzle duct 47 through which the hot-melt adhesive can be dosed onto a substrate, not illustrated.

Illustrated in FIGS. 2 and 3 are side elevations of the applicator head 10. FIG. 2 shows the side elevation according to an arrow referenced 2 in FIG. 1. To begin with, it is evident that the applicator head 10 has only a slight width c, which in the embodiment amounts to only 12 mm. This makes it possible to arrange a plurality of applicator heads 10 side by side in an adhesive applicator machine, with the aid of the mounting device 40.

Visible between the casing parts 12 and 13 is the thermal separating layer 14. While above the casing part 12 the cover plate 17 fastened by means of screws S is illustrated, the side elevation of the casing part 13 shows the leakage bore 36 and the nozzle plate 45 providing the mounting of the nozzle component 46, which nozzle plate, in turn, is joined to the valve head 20 by means of screws, not illustrated.

Shown in FIG. 3, furthermore, is the side elevation according to an arrow referenced 3 in FIG. 1. Additionally visible in this side elevation, are the control and supply line 18 as well as the hot-melt adhesive duct 22.

Motion or movement of the valve body 42, which in the rest position bears around the sealing surfaces 43, is effected by the piezoelectric stacks 23a and 23b, in that these are alternately acted upon by an electrical potential causing them to expand.

For instance, as the piezoelectric stack 23b expands under the effect of voltage, a clockwise torque is imparted to the rocker 25, causing it and the valve member 19 connected to it to move in the X direction. Amounting to about 0.15 to 0.17 mm, the stroke of the valve member 19 moves the valve body 42 toward the nozzle duct 47, causing the hot-melt adhesive to issue at high pressure out of the resulting valve opening.

To even out the circular motion of the free end 28 of the rocker 25, the valve member 19 comprises a flexible U-joint 39 which is arranged transverse to the longitudinal expanse of the rocker 25 and has a thickness b of only 0.1 to 0.5 mm. Additionally, the limited cross section of the flexible U-joint 39 reduces the heat transfer from the casing part 13 to the casing part 12.

When the voltage supply to the piezoelectric stack 23b is interrupted and the voltage is then applied across the piezoelectric stack 23a, a counterclockwise torque about the joint 26 is created. As a result, the rocker 25 and the valve member 19 move upward in the Y direction. In this case, the valve body 42 also moves opposite to the flow direction of the hot-melt adhesive—for which reason the so-called negative closure was coined—toward the valve seat 44, thereby gradually reducing the available flow cross section. This motion of the valve body 42 directed opposite to the flow, in conjunction with the high pressure of the hot-melt adhesive, ultimately causes the hot-melt adhesive contained below the valve body 42 and in the hot-melt adhesive duct 47 to be sucked back, for which reason the adhesive spot contained on the substrate, not illustrated, has a good tear-off edge.

The opening and closing operation of the valve requires only a time of 0.8 to 0.25 ms. This short cycle time is accomplished due to the high reactivity of the piezoelectric stacks 23a and 23b.

The piezoelectric element 24 consisting of the two piezoelectric stacks 23a and 23b is controlled and regulated by a specific electronics array 48, for in turn controlling the valve, which is essentially arranged in the chamber 16 illustrated in FIG. 1. Illustrated in the block diagram in FIG. 4, the electronics array 48 provides the alternating voltage action on the two piezoelectric stacks 23a and 23b and also facilitates operation of the applicator head 10 which is especially energy-saving and, thus, characterized by low thermal losses.

Figure 4:
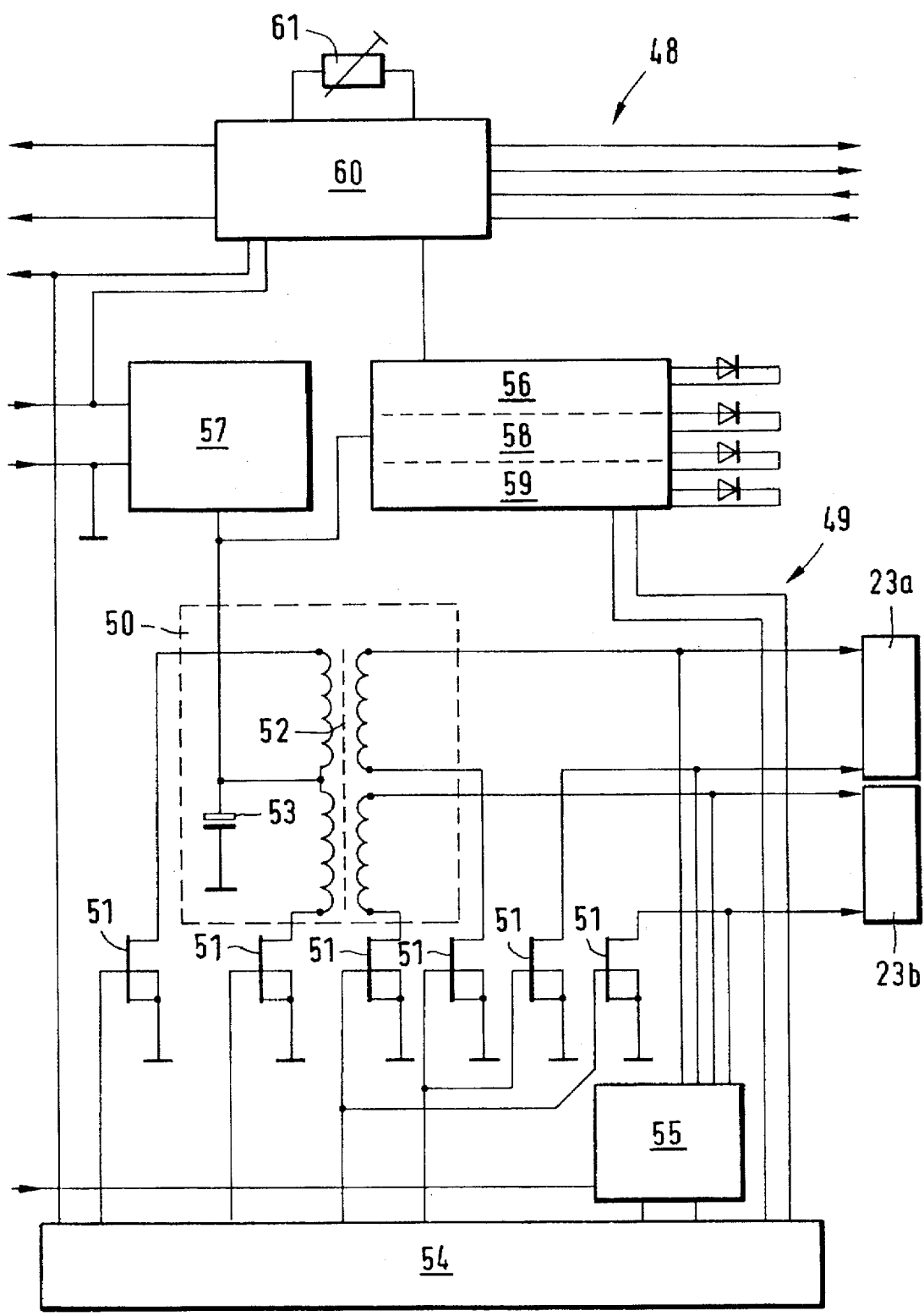
FIG. 4 is a simplified block diagram of the electronic setup of the valve of the applicator head.

Specifically for purposes of reduced energy consumption, the electronics array 48 for the valve comprises a so-called charge pump arrangement 49, which is basically illustrated in FIG. 4. Said charge pump arrangement 49 comprises an intermediate storage 50 and a plurality of field effect transistors 51, the intermediate storage 50 and the field effect transistors 51 being connected to both piezoelectric stacks 23a and 23b. The intermediate storage 50 contains a coil 52 and a capacitor 53. The energy savings in the operation of the piezoelectric element 24 is accomplished through the charge reversal principle that can be employed in the so-called push-pull arrangement of the piezoelectric stacks 23a and 23b.

Basically, this charge reversal principle means that the energy (charge) stored in one piezoelectric stack 23a or 23b is "portionwise" transformed into the respective other piezoelectric stack 23a or 23b. This takes place within the charge pump arrangement 49 in that the charge of one piezoelectric stack 23a or 23b is temporarily stored in the intermediate storage 50 and that the field effect transistors 51 transform the stored energy stepwise, by specific switching of different networks, to the respective other piezoelectric stack 23a or 23b. The time sequence of the charge reversal processes and the respective state of conductance of the field effect transistors 51 is determined by a programmable controller 54. Acting on the programmable controller 54, however, is still another regulating circuit 55 which continually scans the set point/actual value comparison of the voltage state of the individual piezoelectric stacks 23a and 23b.

This charge reversal principle makes it possible to feed the energy present in a piezoelectric stack 23a or 23b back into the primary circuit and to reuse it for excitation of the respective other piezoelectric stack 23a or 23b.

But since in these electronic processes a small part of the energy is converted to heat and, furthermore, a larger part of the electrical energy to mechanical energy, it is necessary to continually balance this energy deficit. This is done with the energy provided by the regulator 57 and the internal voltage supply 56.

Moreover, the electronics array 48 of the valve features a clock generator 58 and a state display 59 which, however, are arranged outside the applicator head 10. While the clock generator—as its name implies—provides the clock for the electronic processes taking place, the state display 59 is an optical display for the operator.

The electronics array 48 of the valve additionally comprises a temperature regulator 60 which keeps the valve temperature at the temperature preselected on a set valve potentiometer 61. This means that the temperature sensor 38 arranged above the heating cartridge 21 continuously measures the valve temperature. The valve is released by the programmable controller 54 only when this temperature matches the temperature set on the setpoint potentiometer 61 and, thus, the operating temperature prevails.

Lastly, a path measuring device 62 is arranged in the applicator head 10 in the area between the base part 27 and rocker 25. The path measuring device 62 consists of a printed circuit board 63 and two coils 64 mounted on it. The printed circuit board 63 is mounted in an appropriate recess 65 in the base part 27. A tongue type projection 66 fused to the rocker 25 protrudes in between the two coils 64 arranged on the printed circuit board 63. As the rocker 25 moves— powered by the piezoelectric stacks 23a or 23b—the position of the tongue type projection 66 changes relative to the two coils 64 respectively arranged above and below the projection 66. This positional change of the projection 66 also changes the inductance of the current-carrying coils 64, the inductance change being a direct measure of the position of the valve body 42 within the valve head 20. With the aid of this measuring method it is possible to intervene in the operational sequence of the applicator head 10 in such a way that a very specific valve curve is achieved.

Obviously, many modifications and variations of the present invention are possible in light of the above teachings. It is therefore to be understood that within the scope of the appended claims, the present invention may be practiced otherwise than as specifically described herein.

We claim:

1. An applicator head for the dosed dispensation of a fluid medium, comprising:

a casing;

a valve seat defined within said casing;

a valve member disposed within said casing for movement between closed and opened positions with respect to said valve seat;

a duct fluidically connected to said valve member for conducting a fluid medium toward said valve member such that said fluid medium is able to be dispensed from said applicator head when said valve member is moved from said closed position to said opened position with respect to said valve seat; and valve drive means for moving said valve member between said closed and opened positions with respect to said valve seat;

said valve drive means comprising a rocker member pivotably mounted at a first end thereof about a pivot point defined between a first surface of said rocker member and said casing, and having a second end thereof fixedly connected to said valve member; and a pair of piezoelectric means, operatively connected to a voltage supply and operatively connected to a second surface of said rocker member upon opposite sides of said pivot point of said rocker member, for actuating said rocker member in an alternative manner when said pair of piezoelectric means are selectively supplied with a suitable voltage from said voltage supply such that when a first one of said piezoelectric means is actuated, said rocker member is caused to pivot in a first one of clockwise and counterclockwise directions about said pivot point so as to move said valve member away from said valve seat and toward said opened position so as to permit dispensing of said fluid medium, whereas when a second one of said piezoelectric means is actuated, said rocker member is caused to pivot in a second one of said clockwise and counterclockwise directions about said pivot point so as to retract said valve member back toward said valve seat and said closed position so as to prevent dispensing of said fluid medium.

2. The applicator head as set forth in claim 1, wherein:

said fluid medium to be dispensed by said applicator head comprises a fluid medium selected from the group of hot-melt adhesives, lubricants, and paints.

3. The applicator head as set forth in claim 1, wherein:

said valve member comprises a valve body operatively associated with said valve seat so as to define said closed position of said valve member when said valve body is seated upon said valve seat, and to define said opened position of said valve member when said valve body is disposed away from said valve seat; and a valve rod interconnecting said valve body and said rocker member.

4. The applicator head as set forth in claim 3, wherein:

said valve rod comprises a flexible U-joint at an axial position intermediate its end portions connected to said rocker member and said valve body for effectively converting said pivotable movement of said rocker member to linear movement of said valve body.

5. The applicator head as set forth in claim 3, wherein:

said casing comprises first and second casing parts;

a thermal separating layer is interposed between said first and second casing parts so as to thermally isolate said first and second casing parts from each other, said thermal separating layer having an aperture defined therethrough;

said valve drive means, comprising said rocker member and said piezoelectric means, being disposed within said first casing part;

said medium duct, said valve seat, and said valve body being disposed within said second casing part; and said valve rod passes through said aperture defined within said thermal separating layer so as to interconnect said valve body and said rocker member while said thermal separating layer thermally isolates said first and second casing parts from each other.

6. The applicator head as set forth in claim 5, further comprising:

heating means disposed within said casing within the vicinity of said fluid medium duct for heating said fluid medium, to a predetermined temperature, conducted toward said valve member; and temperature sensing means for determining the temperature level of said fluid medium, as heated by said heating means, conducted toward said valve member.

7. The applicator head as set forth in claim 6, further comprising:

temperature regulator means operatively connected to said heating means and said temperature sensing means for controlling the activation of said heating means in accordance with temperature values sensed by said temperature sensing means.

8. The applicator head as set forth in claim 5, further comprising:

electronic control means for supplying voltage potential in an alternating manner to said pair of piezoelectric means.

9. The applicator head as set forth in claim 8, wherein said electronic control means comprises:

a charge pump arrangement interposed between a voltage supply and said pair of piezoelectric means.

10. The applicator head as set forth in claim 9, wherein said charge pump arrangement comprises:

intermediate storage means, operatively connected to said piezoelectric means, for temporarily storing charges of said piezoelectric means;

a plurality of transistors, interposed between said intermediate storage means and said piezoelectric means, for transforming said charges stored within said intermediate storage means from one of said piezoelectric means and for supplying said charges to the other one of said piezoelectric means; and programmable controller means for controlling the conductance states of said plurality of transistors.

11. The applicator head as set forth in claim 10, wherein:

said intermediate storage means comprises a coil and a capacitor.

12. The applicator head as set forth in claim 8, wherein:

said first casing part comprises an enclosed chamber for housing said electronic control means.

13. The applicator head as set forth in claim 1, wherein:

each one of said piezoelectric means comprises a plurality of stacked piezoelectric elements.

14. The applicator head as set forth in claim 13, wherein:

each one of said plurality of stacked piezoelectric elements comprises a ceramic blade.

15. The applicator head as set forth in claim 13, wherein:

said stacked piezoelectric elements comprising said pair of piezoelectric means comprise two stacks of piezoelectric elements which are disposed parallel to each other.

16. The applicator head as set forth in claim 1, wherein:

said rocker member is pivotably mounted upon said casing by means of an upstanding joint located at said pivot point such that portions of said rocker member, disposed upon opposite sides of said pivot point, are spaced from said casing so as to permit said pivotable movement of said rocker member with respect to said casing in said clockwise and counterclockwise directions.

17. The applicator head as set forth in claim 1, wherein:

said applicator head has a substantially rectangular parallelepiped configuration such that a plurality of applicator heads can be fastened together in side-by-side contact with respect to each other by bracket connecting means.

18. The applicator head as set forth in claim 1, further comprising:

heating means disposed within said casing within the vicinity of said fluid medium duct for heating said fluid medium, to a predetermined temperature, conducted toward said valve member; and temperature sensing means for determining the temperature level of said fluid medium, as heated by said heating means, conducted toward said valve member.

19. The applicator head as set forth in claim 18, further comprising:

temperature regulator means operatively connected to said heating means and said temperature sensing means for controlling the activation of said heating means in accordance with temperature values sensed by said temperature sensing means.

20. The applicator head as set forth in claim 1, further comprising:

electronic means for determining the position of said valve member with respect to said opened and closed positions.

21. The applicator head as set forth in claim 20, wherein said electronic means comprises:

a projection integrally disposed upon said rocker member;

a printed circuit board mounted upon said casing; and a pair of coils mounted upon said printed circuit board and spaced with respect to each other so as to define a space therebetween within which said projection of said rocker member is disposed, whereby upon movement of said rocker member, and corresponding movement of said valve member, said projection of said rocker member will move with respect to said pair of coils thereby changing the inductance of said coils so as to respectively indicate the positional change of said valve member.

22. The applicator head as set forth in claim 1, further comprising:

flexible joint means defined between said first surface of said rocker member and said casing, and between said second surface of said rocker member and said pair of piezoelectric means for permitting said rocker member to pivot with respect to said casing and said pair of piezoelectric means when said first and second piezoelectric means are selectively actuated.

23. An applicator head for the dosed dispensation of a fluid medium, comprising:

a casing;

a valve seat defined within said casing;

a valve member disposed within said casing for movement between closed and opened positions with respect to said valve seat;

a duct fluidically connected to said valve member for conducting a fluid medium toward said valve member such that said fluid medium is able to be dispensed from said applicator head when said valve member is moved from said closed position to said opened position with respect to said valve seat; and valve drive means for moving said valve member between said closed and opened positions with respect to said valve seat;

said valve drive means comprising a rocker member pivotably mounted at a first end thereof about a pivot point defined between a first surface of said rocker member and said casing, and having a second end thereof fixedly connected to said valve member; and a pair of means, operatively connected to a second surface of said rocker member and disposed upon opposite sides of said pivot point of said rocker member, for actuating said rocker member in an alternative manner such that when a first one of said pair of actuating means is actuated, said rocker member is caused to pivot in a first one of clockwise and counterclockwise directions about said pivot point so as to move said valve member away from said valve seat and toward said opened position so as to permit dispensing of said fluid medium, whereas when a second one of said actuating means is actuated, said rocker member is caused to pivot in a second one of said clockwise and counterclockwise directions about said pivot point so as to retract said valve member back toward said valve seat and said closed position so as to prevent dispensing of said fluid medium.

24. The applicator head as set forth in claim 23, wherein:

said pair of actuating means comprises a pair of stacked piezoelectric elements.

25. An applicator head for the dosed dispensation of a fluid medium, comprising:

a casing;

a valve seat defined within said casing;

a valve member disposed within said casing for movement between closed and opened positions with respect to said valve seat;

a duct fluidically connected to said valve member for conducting a fluid medium toward said valve member such that said fluid medium is able to be dispensed from said applicator head when said valve member is moved from said closed position to said opened position with respect to said valve seat;

valve drive means for moving said valve member between said closed and opened positions with respect to said valve seat; said valve drive means comprising a rocker member pivotably mounted at a first end thereof about a pivot point defined between said first end of said rocker member and said casing, a second end of said rocker member being fixedly connected to said valve member, and a pair of piezoelectric means, operatively connected to a voltage supply and operatively connected at first ends thereof to said rocker member upon opposite sides of said pivot point of said rocker member, for actuating said rocker member in an alternative manner when said pair of piezoelectric means are selectively supplied with a suitable voltage from said voltage supply such that when a first one of said piezoelectric means is actuated, said rocker member is caused to pivot in a first one of clockwise and counterclockwise directions about said pivot point so as to move said valve member away from said valve seat and toward said opened position so as to permit dispensing of said fluid medium, whereas when a second one of said piezoelectric means is actuated, said rocker member is caused to pivot in a second one of said clockwise and counterclockwise directions about said pivot point so as to retract said valve member back toward said valve seat and said closed position so as to prevent dispensing of said fluid medium; and automatic temperature compensation means mounted upon said casing and operatively engaged with second ends of said pair of piezoelectric means for permitting thermal expansion of said pair of piezoelectric means while retaining said first ends of said piezoelectric means operatively connected to said rocker member.

26. The applicator head as set forth in claim 25, wherein:

said automatic temperature compensation means comprises a flexible cover plate.

27. An applicator head for the dosed dispensation of a fluid medium, comprising:

a casing;

a valve seat defined within said casing;

a valve member disposed within said casing for movement in substantially vertically linear opposite directions between closed and opened positions with respect to said valve seat;

a duct fluidically connected to said valve member for conducting a fluid medium toward said valve member such that said fluid medium is able to be dispensed from said applicator head when said valve member is moved from said closed position to said opened position with respect to said valve seat; and valve drive means for moving said valve member in said substantially vertically linear opposite directions between said closed and opened positions with respect to said valve seat;

said valve drive means comprising a substantially horizontally disposed rocker member pivotably mounted at a first end thereof about a pivot point defined between said rocker member and said casing, and having a second end thereof fixedly connected to said valve member; and a pair of substantially vertically oriented piezoelectric means, operatively connected to a voltage supply and operatively connected to said substantially horizontally disposed rocker member upon opposite sides of said pivot point of said substantially horizontally disposed rocker member, for actuating said substantially horizontally disposed rocker member in an alternative manner when said pair of substantially vertically oriented piezoelectric means are selectively supplied with a suitable voltage from said voltage supply such that when a first one of said pair of substantially vertically oriented piezoelectric means is actuated, said substantially horizontally disposed rocker member is caused to pivot in a first one of clockwise and counterclockwise directions about said pivot point such that said second end of said substantially horizontally disposed rocker member, fixedly connected to said valve member, moves in a first one of said substantially vertically linear opposite directions so as to correspondingly move said valve member in said first one of said substantially vertically linear opposite directions away from said valve seat and toward said opened position so as to permit dispensing of said fluid medium from said applicator head, whereas when a second one of said pair of substantially vertically oriented piezoelectric means is actuated, said substantially horizontally disposed rocker member is caused to pivot in a second one of said clockwise and counterclockwise directions about said pivot point such that said second end of said substantially horizontally disposed rocker member, fixedly connected to said valve member, moves in a second one of said substantially vertically linear opposite directions so as to correspondingly move said valve member in said second one of said substantially vertically linear opposite directions and thereby retract said valve member back toward said valve seat and said closed position so as to prevent dispensing of said fluid medium from said applicator head.

* * * * *